(12) United States Patent
Ghosh et al.

(10) Patent No.: US 9,691,104 B2
(45) Date of Patent: Jun. 27, 2017

(54) SYSTEM AND METHOD FOR PROVIDING REVENUE PROTECTION BASED ON WEATHER DERIVATIVES AND MERCHANT TRANSACTION DATA

(71) Applicant: MASTERCARD INTERNATIONAL INCORPORATED, Purchase, NY (US)

(72) Inventors: Debashis Ghosh, Charlotte, NC (US); Randall K. Shuken, Westport, CT (US); Mary E. Lesbirel, Holmdel, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 349 days.

(21) Appl. No.: 14/490,932

(22) Filed: Sep. 19, 2014

(65) Prior Publication Data

US 2016/0086284 A1  Mar. 24, 2016

(51) Int. Cl.
*G06Q 40/08* (2012.01)
(52) U.S. Cl.
CPC .................. *G06Q 40/08* (2013.01)
(58) Field of Classification Search
CPC ..................................... G06Q 40/08

USPC ............................................ 705/4
See application file for complete search history.

(56) References Cited

U.S. PATENT DOCUMENTS

| | | | | |
|---|---|---|---|---|
| 2006/0136315 A1* | 6/2006 | Muthiki | G06Q 30/02 | 705/35 |
| 2006/0190368 A1* | 8/2006 | Kesterman | G06Q 40/00 | 705/35 |
| 2008/0147417 A1* | 6/2008 | Friedberg | G06Q 40/02 | 705/7.28 |
| 2013/0332205 A1* | 12/2013 | Friedberg | G06Q 40/08 | 705/4 |

* cited by examiner

*Primary Examiner* — Lindsay M Maguire
(74) *Attorney, Agent, or Firm* — Howard IP Law Group, PC (57) ABSTRACT

Processor-executable methods, computing systems, and related processing for the creation, transaction, administration, management and communication of data relating to weather-related guarantees or revenue protection policies for mitigating the risk of loss of recurrent merchant revenue due to one or more weather conditions, based on analysis of revenues resulting from payment card transactions associated with the merchant.

16 Claims, 10 Drawing Sheets

SYSTEM AND METHOD FOR PROVIDING REVENUE PROTECTION BASED ON WEATHER DERIVATIVES AND MERCHANT TRANSACTION DATA

CROSS-REFERENCE TO RELATED APPLICATIONS

None.

FIELD OF INVENTION

The present disclosure relates to payment card systems, and more particularly, to systems and methods for determining and pricing merchant revenue protection in view of potential weather-related disturbances and based on merchant sales via payment card transactions.

BACKGROUND

Business sales revenues and cash flow are significant factors in determining a company's financial health and viability. Sales revenue is an indicator of how much the company is selling to its customers. Cash flow is an indicator of how well the company is turning those sales into cash that it can use, for example, to pay its own bills, or to return as profits to its owners.

Merchants of all sizes require sufficient cash flow in order to meet their business obligations (e.g. rent, utilities, payroll, inventory, etc.). Cash comes into a business (cash inflows), mainly through sales of goods or services and flows out (cash outflows) to pay for costs such as raw materials, transport, labor, and power. However, many merchants across multiple industries have experienced significant losses to their bottom line due to unpredictable weather patterns. Because weather can negatively impact revenue or costs for a business, weather derivatives may be used to reduce the impact that adverse weather may create. However, it is often difficult for merchants to assess the potential impact that weather may have on their revenues, let alone obtain an appropriate hedge against adverse weather for their business. Systems and methods are desired for identifying and mitigating potentially detrimental effects of adverse weather conditions on the revenues of a company, while assisting merchants in hedging their revenue stream in the event of unpredictable weather changes that can otherwise cause profit loss.

SUMMARY

In embodiments, computer-implemented systems and methods for determining pricing for revenue protection for merchants against one or more weather conditions comprise: determining via a computer processor, recurring merchant revenue for a given merchant over a given time interval based on analysis of payment card transactions conducted over a payment card network and corresponding to the merchant; generating via a computer processor, merchant revenue profile data representative of changes in recurring merchant revenue as a function of one or more weather parameters, by applying historical weather data to the merchant payment card transaction record data; the historical weather data being matched to the location of the merchant business and the date and time of the payment card transaction records; and generating an offer of revenue protection covering a term and including a payout amount and one or more weather-specific payout conditions, based on the merchant revenue profile data and the recurring merchant revenue data.

In one embodiment, data is stored in a database corresponding to the one or more weather-specific payout conditions of the insurance agreement.

Comparison of one or more weather conditions is made during at least part of the term with weather-specific conditions of the revenue protection agreement, for determining whether a payout is required.

Payment card transaction records of a plurality of merchants are stored in a database and processing of the payment card transaction records is implemented via an analytics engine utilizing statistical analyses and techniques for categorizing merchants and generating one or more revenue profiles based on aggregated merchant payment card transactions data of a plurality of merchants of the same category. The system and method further comprises determining aggregate demand for the revenue protection according to the number of merchants within a given category and a given geographical region based on the processing of the payment card transactions data.

The system and method further comprises obtaining from a third party one or more weather-related contracts, the volume of the weather-related contracts corresponding to the aggregate payout amount of the weather-specific offers of revenue protection made to the merchant, the one or more weather-related contracts corresponding to the geographic regions and weather parameters associated with the weather-specific offers of revenue protection to the merchant; and allocating fractional portions of the value of the one or more weather-related contracts to the weather-specific offers of revenue protection.

The payment card transaction data includes at least a customer identifier, merchant identifier, transaction amount, geographic region, and transaction date. The one or more weather parameters comprises one or more of temperature, solarity, humidity, wind, and precipitation.

DETAILED DESCRIPTION

Disclosed herein are processor-executable methods, computing systems, and related processing for the creation, distribution, administration, management and communication of weather-based guarantees or insurance policies for protecting merchant revenue in the event of adverse weather conditions and based on payment card transactions made over a payment card system. While the embodiments of the present disclosure will generally be described as being generated and otherwise administered by a card network, it is envisioned that these policies may originate from an issuer, or other third party, without departing from the scope of the present invention.

It is to be understood that a payment card is a card that can be presented by the cardholder (i.e., customer) to make a payment. By way of example, and without limiting the generality of the foregoing, a payment card can be a credit card, debit card, charge card, stored-value card, or prepaid card or nearly any other type of financial transaction card. It is noted that as used herein, the term "customer", "cardholder," "card user," and/or "card recipient" can be used interchangeably and can include any user who holds a payment card for making purchases of goods and/or services. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction acquirer" can include, for example, a merchant, a merchant terminal, an automated teller machine (ATM), or any other suitable institution or device configured to initiate a financial transaction per the request of the customer or cardholder.

A "payment card processing system" or "credit card processing network" or "card network", such as the MasterCard network exists, allowing consumers to use payment cards issued by a variety of issuers to shop at a variety of merchants. With this type of payment card, a card issuer or attribute provider, such as a bank, extends credit to a customer to purchase products or services. When a customer makes a purchase from an approved merchant, the card number and amount of the purchase, along with other relevant information, are transmitted via the processing network to a processing center, which verifies that the card has not been reported lost or stolen and that the card's credit limit has not been exceeded. In some cases, the customer's signature is also verified, a personal identification number is required or other user authentication mechanisms are imposed. The customer is required to repay the bank for the purchases, generally on a monthly basis. Typically, the customer incurs a finance charge for instance, if the bank is not fully repaid by the due date. The card issuer or attribute provider may also charge an annual fee.

A "business classification" is a group of merchants and/or businesses, classified by the type of goods and/or service the merchant and/or business provides. For example, the group of merchants and/or businesses can include merchants and/or businesses which provide similar goods and/or services. In addition, the merchants and/or businesses can be classified based on geographical location, sales, and any other type of classification, which can be used to define a merchant and/or business with similar goods, services, locations, economic and/or business sector, industry and/or industry group.

Determination of a merchant classification or category may be implemented using one or more indicia or merchant classification codes to identify or classify a business by the type of goods or services it provides. For example, ISO Standard Industrial Classification ("SIC") codes may be represented as four digit numerical codes assigned by the U.S. government to business establishments to identify the primary business of the establishment. Similarly a "Merchant Category Code" or "MCC" is also a four-digit number assigned to a business by an entity that issues payment cards or by payment card transaction processors at the time the merchant is set up to accept a particular payment card. Such classification codes may be included in the payment card transactions records. The merchant category code or MCC may be used to classify the business by the type of goods or services it provides. For example, in the United States, the merchant category code can be used to determine if a payment needs to be reported to the IRS for tax purposes. In addition, merchant classification codes are used by card issuers to categorize, track or restrict certain types of purchases. Other codes may also be used including other publicly known codes or proprietary codes developed by a card issuer, such as NAICS or other industry codes, by way of non-limiting example.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

It is understood that merchants tend to purchase conventional insurance for protection against circumstances which result in a loss, such as floods, hurricanes, tornadoes, and other weather events or natural phenomena. However, systems and methods according to embodiments of the present disclosure enable merchants to better regulate their cash flow based on weather conditions by analyzing payment card transactions processed over a payment card network to determine a recurring merchant revenue. This may be accomplished by determining the percentage of customers that are recurring or regular customers for a given merchant, and aggregating the purchase amounts over a given time interval. The system applies historical weather data to the payment card transaction data to analyze the payment card transactions records to determine relationships, patterns, and trends in order to identify deviations in the number of and/or average purchase amount of transactions correlated with a change in a particular weather condition. Such weather condition may be an excessive amount (or substantially decreased amount) of precipitation (e.g. snow or rain), very high or low temperatures, or other weather-related conditions (e.g. abnormally high or low humidity, solarity, etc.). Such statistical analyses may be targeted to particular subsets of the transactions data, including by way of non-limiting example, one or more particular geographic regions, business categories, customer categories, product or service types, and purchasing frequencies. The analytics engine may utilize independent variables (e.g. weather parameters, date and time, seasonal dates) as well as dependent variables representative of one or more purchasing events, customer types or profiles, merchant types or profiles, purchase amounts, and purchasing frequencies, by way of example only. The analytics engine may use models such as regression analysis, correlation, analysis of variances, time series analysis, determination of frequency distributions, segmentation and clustering applied to the payment card transactions data compiled via the payment card network in order to determine and predict the effect particular categories of data have on other categories.

The system is configured to generate, based on the payment card transactions data and the historical weather data, utility curves or data measurements depicting the fluctuation in revenue from a nominal baseline value as a function of one or more weather parameters, including but not limiting to temperature, precipitation, solarity, humidity, wind speed or wind chill, and so on. That is, the system provides an estimate of the effect that certain weather conditions may have on a given merchant's revenue stream, using the merchant's underlying payment card transactions data as a basis. In this manner the merchant can assess his or her projected revenue exposure based on weather conditions. Based on the merchant's risk/reward profile, a merchant may wish to hedge a percentage of his or her cash flow via weather derivatives. The system is configured to generate a projected hedge amount for a given merchant based on the underlying payment card transactions data and the merchant's risk level and based on future weather forecast data over a given time interval for at least one weather parameter determined as a driver of revenue. Offers of revenue protection of (or up to) a given monetary amount for one or more weather derivatives may be generated by the system for purchase by the merchant based on the above. Offers are provided to multiple merchants of the same type (e.g. restaurant owners) within a common geographic region and having similar businesses similarly affected by the weather. The system then aggregates demand for the revenue protection by pooling merchants to contract with an entity to obtain weather derivatives corresponding to the number of merchants within a given category and a given geographical region, based on the processing of the payment card transactions data.

The weather-related contracts or weather derivates are purchased by the network payment card entity according to a volume corresponding to the aggregate payout amount of the weather-specific offers of revenue protection from the merchants. The system then divides up or allocates each of the weather derivatives into smaller units corresponding to the geographic regions and particular weather parameters associated with the weather-specific offers of revenue protection; and allocates fractional portions of the value of the one or more weather-related derivative contracts to the weather-specific offers of revenue protection.

In some embodiments, offers of revenue protection may be generated automatically based on the degree of correlation between the amount of a merchant's recurring revenue stream and one or more weather parameters, and a threshold value. Historical and/or forecasted weather data for a given geographical region may be obtained from one or several sources, such as a weather feed imported from one or more of the National Weather Service, U.S. Oceanographic Service, or other suitable weather provider.

The payment card transaction data utilized herein may comprise a multiplicity of payment card transactions records that include customer information, merchant information, and transaction amounts which are subsequently processed to identify one or more of purchasers, recurrent customers, geographic regions, general amounts, seasonal volume, and the like.

Figure 1:
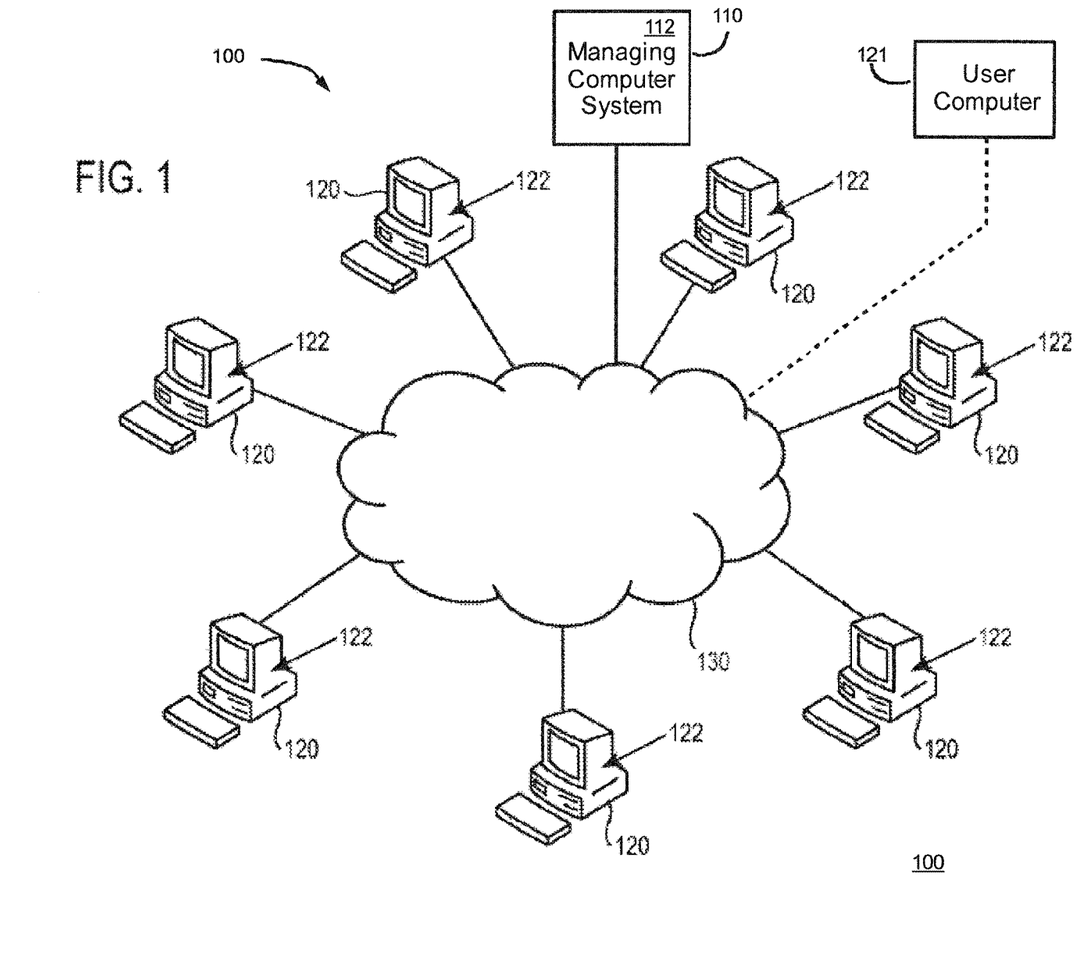
FIG. 1 illustrates a system architecture within which some embodiments of the present disclosure may be implemented.

Referring now to FIG. 1, there is shown a high-level diagram illustrating an exemplary system for identifying behavioral trends (e.g. activity or purchasing trends) using transaction and weather data according to an embodiment of the disclosure. As shown in FIG. 1, the system 100 includes a managing computer system 110 that includes a data storage device or data warehouse for storing payment card transaction records associated with a card network provider, or payment card service provider 112. Each payment transaction performed by a transaction acquirer and/or merchant 122 having a corresponding merchant computer system 120 is transferred to the managing computer system 110 via a network 130. The network 130 connects the computer system 120 of the transaction acquirer or merchant 122 with the managing computer system 110 of the payment card service provider 112. Transactions performed between a customer or cardholder and a transaction acquirer or merchant 122 may comprise point of sale transactions, or electronic point of sale transactions performed via a customer or cardholder computer 121.

The network 130 can be virtually any form or mixture of networks consistent with embodiments as described herein. These include, but are not limited to, telecommunication or telephone lines, the Internet, an intranet, a local area network (LAN), a wide area network (WAN), virtual private network (VPN) and/or a wireless connection using radio frequency (RF) and/or infrared (IR) transmission to name a few.

Figure 2:
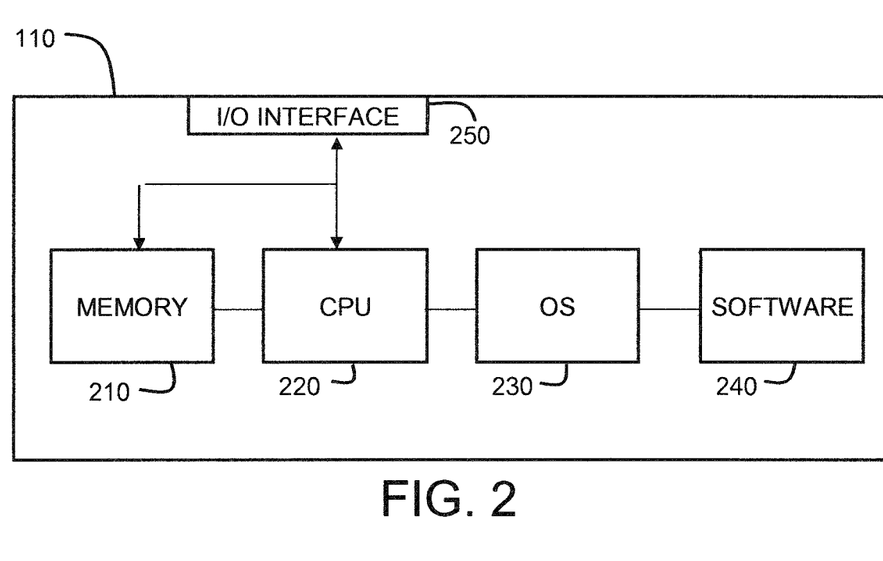
FIG. 2 is a functional block diagram of a managing computer system for a payment card service provider useful in implementing aspects of the present system and method.

The managing computer system 110 for the payment card service provider 112 as shown in FIG. 2 includes at least one memory device 210 configured to store data that associates identifying information of individual customers, merchants, and transactions associated with payment card accounts. System 110 further includes a computer processor 220, and an operating system (OS) 230, which manages the computer hardware and provides common services for efficient execution of various logic circuitry including hardware, software and/or programs 240. The processor 220 (or CPU) carries out the instructions of a computer program, which operates and/or controls at least a portion of the functionality of the managing computer system 110. System 110 further includes device input/output interface 250. Interface 250 is configured to receive and output network and transactions data and information to and/or from managing computer system 110 from and/or to peripheral devices and networks operatively coupled to the system. Such devices may include user 121 and/or merchant 120 terminals, including point of sale terminals, wireless networks and devices, mobile devices and client/server devices, and user interfaces communicatively coupled over one or more networks for interfacing with managing system 110. The I/O interface 250 may include a query interface configured to accept and parse user requests for information based on the payment card transactions data. In addition, the I/O interface may handle receipt of transactions data and perform transactions based processing in response to receipt of transactions data as a result of a particular purchase via a point of sale terminal, by way of non-limiting example only.

The at least one memory device 210 may be any form of data storage device including but not limited to electronic, magnetic, optical recording mechanisms, combinations thereof or any other form of memory device capable of storing data, which associates payment card transactions of a plurality of transaction acquirers and/or merchants. The computer processor or CPU 220 may be in the form of a stand-alone computer, a distributed computing system, a centralized computing system, a network server with communication modules and other processors, or nearly any other automated information processing system configured to receive data in the form of payment card transactions from transaction acquirers or merchants 122. The managing computer system 110 may be embodied as a data warehouse or repository for the bulk payment card transaction data of multiple customers and merchants. In addition, the computer system 120 or another computer system 121 (e.g. user computer of FIG. 1) connected to computer system 110 (via a network such as network 130) may be configured to request or query the managing computer system 110 in order to obtain and/or retrieve information relating to categories of customers, merchants, and services associated therewith, based on information provided via the computer system 120 or 121 and profiling of the transaction data contained in computer system 110 according to the particular query/request.

Figure 3A:
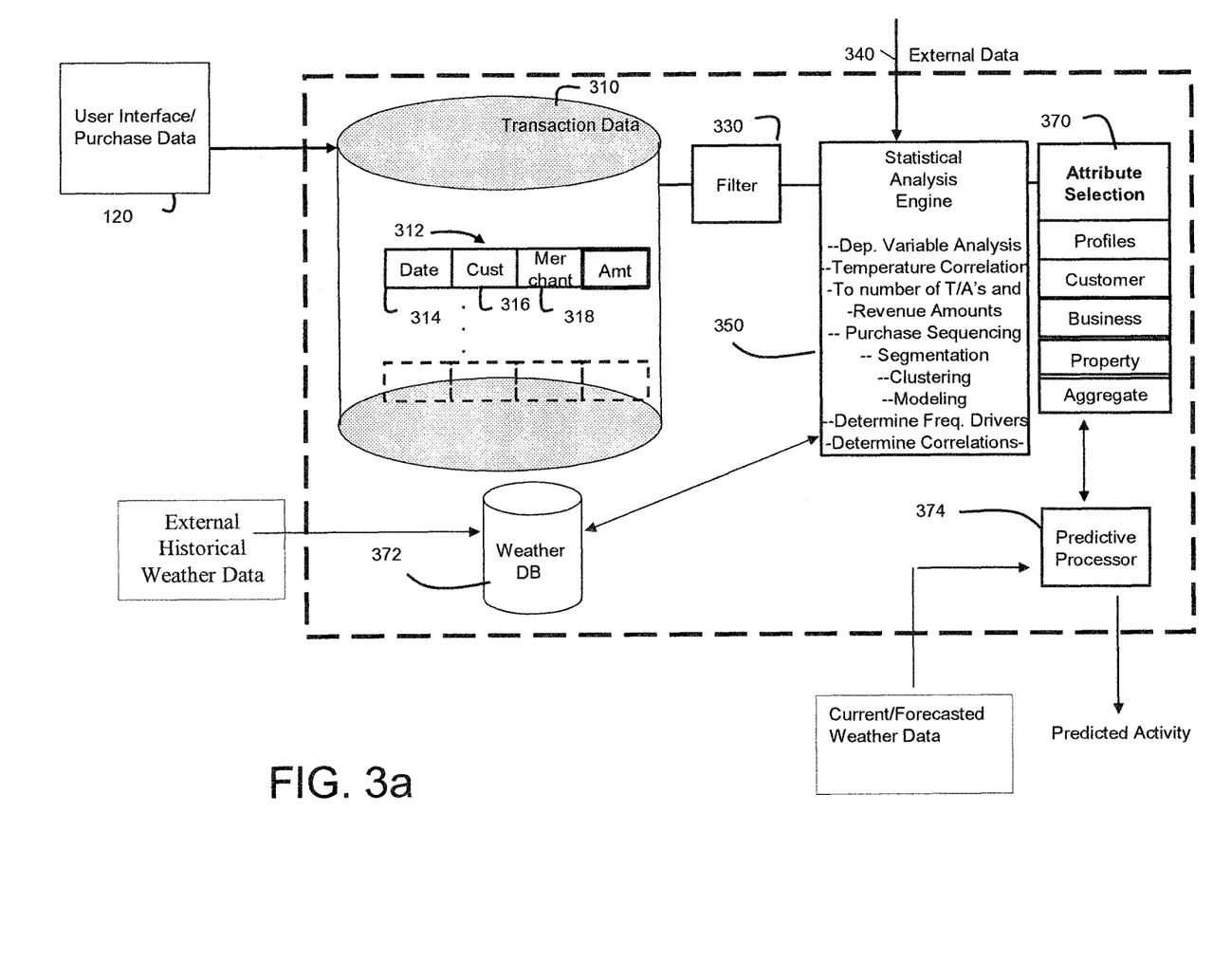
FIG. 3a illustrates a system for providing services related to determining merchant revenue as a function of one or more weather parameters and including revenue protection based on weather conditions and on payment card transactions data, according to an embodiment of the present disclosure.

Referring now to FIG. 3a, there is shown a system block diagram and operational flow for identifying behavioral purchasing trends corresponding to merchants and/or categories of merchants and that correlate to one or more weather conditions, by utilizing payment card transaction data along with geographic historical weather data according to an embodiment of the disclosure. A database 310 containing a multiplicity of transaction data is included in managing computer system 110 (FIGS. 1 and 2). Payment card transaction records 312 may be obtained via various transaction mechanisms, such as credit and debit card transactions between customers and merchants originating via a cardholder terminal or merchant computer (e.g. a personal computer 120). Payment card transaction records 312 may include transaction date 314 as well as customer information 316, merchant information 318 and transaction amount 320. Customer information 316 may further include customer account identifier (ID) and customer type, as provided in an exemplary transaction record illustrated in FIG. 3a. Likewise, merchant information may include the particular merchant ID (e.g. Joe's Pizza) associated with a given transaction, as well as the type or category of the particular merchant (e.g. restaurants) included as part of the payment card transaction record. This information may originate from, for example, passive means, such as ISO 8583 information from all payment card purchases. Additional information regarding the details of a cardholder's transaction history may be provided to the card network by, for example, clearing addenda received after purchases have been completed, and may further populate database 310.

The payment card transaction records 312 may be augmented with non-payment card transaction data labeled as external data 340. The external data may reside within the same transactions data base or may be linked in a separate date base, by way of non-limiting example. The payment card transactions records 312 may be obtained via various transaction mechanisms, such as credit and debit card transactions between customers and merchants. The external data 340 that may optionally be included in the transactions data may include samples of itemized or detailed receipts, firmographics, market data, example service intervals associated with particular products, merchants, and/or geographic regions, by way of non-limiting example. Such data may operate to link customers and merchants with particular purchases of products or services within a given transaction. Additional information such as transaction data relating to on-line purchase transactions vs. in-person purchase transactions may also be included.

Payment card transaction records may include transaction date 314 as well as customer information 316 and merchant information 318. Customer information 316 may further include customer account identifier (ID) and customer type. Customer geography and demographics data may be obtained by modeling of the customer or merchant information and may be categorized for example, by local, regional, state, country and/or other geographic or population and statistical boundaries. Merchant information 318 may include information as to the sellers in a given transaction and include merchant name, merchant type or line of business (MCC code), geographic location of the merchant or purchase, information relating to the purchase amount and date of purchase, date of delivery or service, type and the like. The transaction data is categorized or grouped by the processor in a plurality of ways so as to decompose or break down the various informational components of the transaction data collected within the database. Payment card transaction data 310 stored in managing computer system 110 may be filtered 330 according to the requirements of a particular application in order to selectively identify specific merchants and/or industries from a list of merchants or industries for targeted analysis.

By way of non-limiting example only, the transactions data may be filtered according to different rules or targeting criteria, such as merchant type or category (e.g. fuel delivery companies, auto dealers, outdoor restaurants, etc.), for targeted analysis. In another example, filtering of the transactions data may be performed according to a temporal sequencing of transaction events and/or temporal intervals (e.g. last five years' of merchant payment card revenue data, seasonal date ranges, product servicing frequency, average merchant revenue per transaction, etc.) as well as by merchant or merchant category. Further filtering (e.g. by geographical location, e.g. region, state, county, city, zip code, street) may be applied to further target particular aspects of the transaction data for given applications. According to an embodiment of the present invention, historical weather data 372 is applied to the payment card transactions data by analytics engine 350 in order to generate merchant information (e.g. merchant revenue profile data) that depicts merchant revenue as a function of changes in one or more weather parameters. As discussed herein, historical weather parameters such as temperature, precipitation (e.g. rain or snow), solarity, wind speed, wind chill, and the like are matched to the particular geographic region of one or more merchants, as well as to the corresponding time and date of the payment card transaction records corresponding to the merchants, and overlaid onto the merchant revenue data from the payment card transactions. Weather data may be obtained from any number of standard historical weather sources, such as the National Weather Service, U.S. Oceanographic Service, or other suitable, weather provider. The weather data may represent the independent variable(s) in the statistical analysis of numbers of transactions, as well as overall transaction amounts for a given merchant or category of merchants.

Analytics engine 350 operates on the transaction data and weather data by performing statistical analyses in order to construct logical relationships within and among the transactions records data to associate customers and merchants according to transaction frequency, transaction amount, seasonal attributes and the like. Various types of models and applications may be configured and utilized by analytics engine 350 in order to derive information from the transactions data. Such statistical analyses and modeling may include independent (e.g. temperature, snowfall, rainfall, time, etc.) and dependent (number of transactions for a given merchant, merchant revenue, merchant costs, etc.) variable analysis techniques, such as regression analysis, correlation, analysis of variance and covariance, discriminant analysis and multivariate analysis techniques, by way of non-limiting example. By way of example only, variables may be defined according to different merchant categories and may have different degrees of correlation or association on weather conditions based on the type or category of merchant. Similarly, different products and/or services of particular merchants may likewise have different degrees of correlation or association. Furthermore, variable analysis of purchasing frequency with respect to particular products and/or merchants may also be utilized as part of the analytical engine 350.

Further analytical processing of the transaction data includes performing one or more of variable analysis purchase sequencing, segmentation, clustering, and parameter modeling to establish profiles, trends and other attributes and relationships that link merchants, customers, events and serviceable properties, as well as the merchant spend or revenue generated as a function of one or more weather related parameters. For example, the analysis engine operates on the transactions records to cluster or group certain sets of objects (information contained in the data records) whereby objects in the same group (called a cluster) express a degree of similarity or affinity to each other over those in other groups (clusters).

Data segmentation of the transactions data associated with analytics engine 350 includes dividing customer information and/or merchant information (e.g. customer IDs, merchant IDs) into groups that are similar in specific ways relevant to other variables or parameters such as geographic region, spending preferences, customer type (e.g. individual consumer or business), demographics, and so on.

Figure 3B:
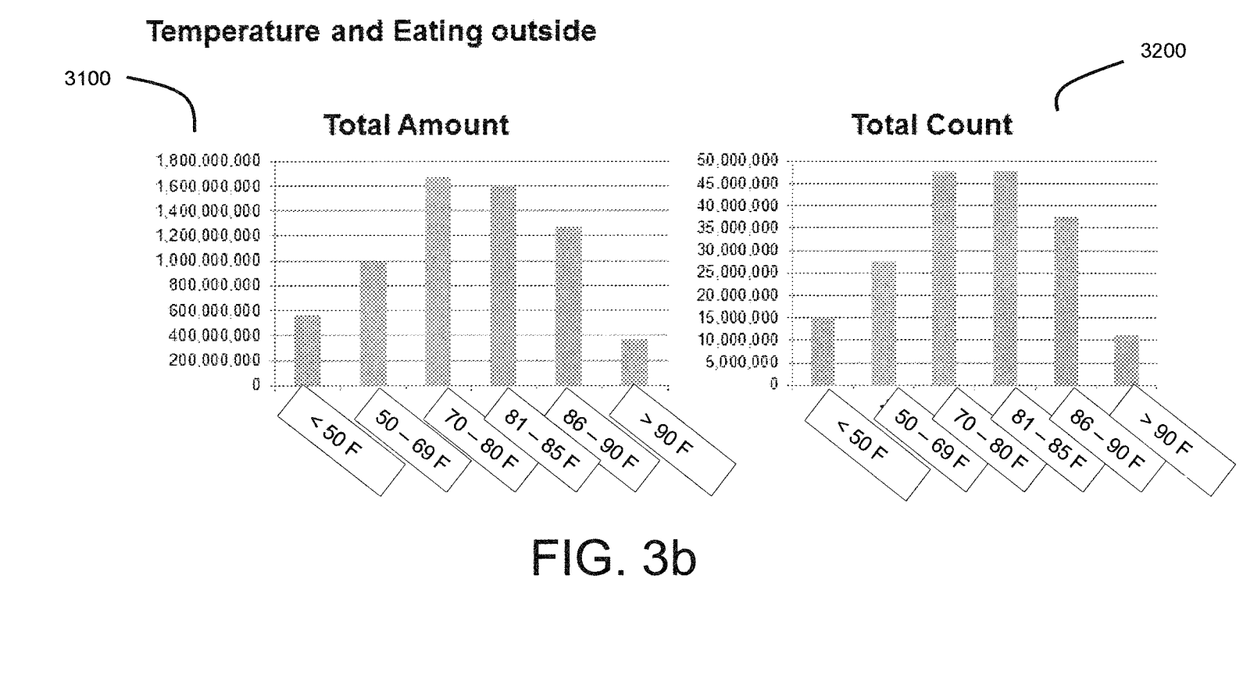
FIG. 3b illustrates histograms representing aggregate merchant revenues and transactions as a function of temperature.

In one embodiment, identified card payment transactions related to cardholder purchasing activities associated with a given merchant or merchant category within a select geographic region may be correlated with a particular weather condition, thus creating a direct correlation between merchant revenue and/or number of transactions associated with a given merchant over a given time interval, in the presence of a given weather condition. For example, FIG. 3b illustrates a utility curve histogram 3100 representing aggregate merchant revenues as a function of temperature (temp. bands) for a given region and merchant category. Utility curve histogram 3200 represents aggregate merchant transaction numbers as a function of temperature. As shown, the data curves 3100 and 3200 reveal that for merchants having outdoor eating establishments, maximum revenue and payment card transactions occur for temperatures between 70-80 degrees. Merchant revenue minima occurs when temperatures exceed 90 degrees and/or when temperatures are less than 50 degrees. Accordingly, offers of merchant revenue protection may be generated based on at least one of these criteria. Similarly, the system may utilize aggregated utility merchant revenue curves as a function of one or more weather parameters in conjunction with particular historical merchant revenue curves vs. one or more weather parameters to assess the accuracy in the prediction for a particular merchant.

By way of further non-limiting example, as shown in FIG. 3a, statistical and variable analysis processing 370 is utilized in order to ascribe attributes to various merchants. Variables such as time, purchase frequency, purchasing geography and location, aggregate customer/merchant spending, and the like may be used to develop profiles for particular serviceable properties, merchants, and customers, as well as more generalized aggregate profiles directed to classes or categories of serviceable properties, merchants, customers, and regions, as well as overall within a particular category.

Figure 7:
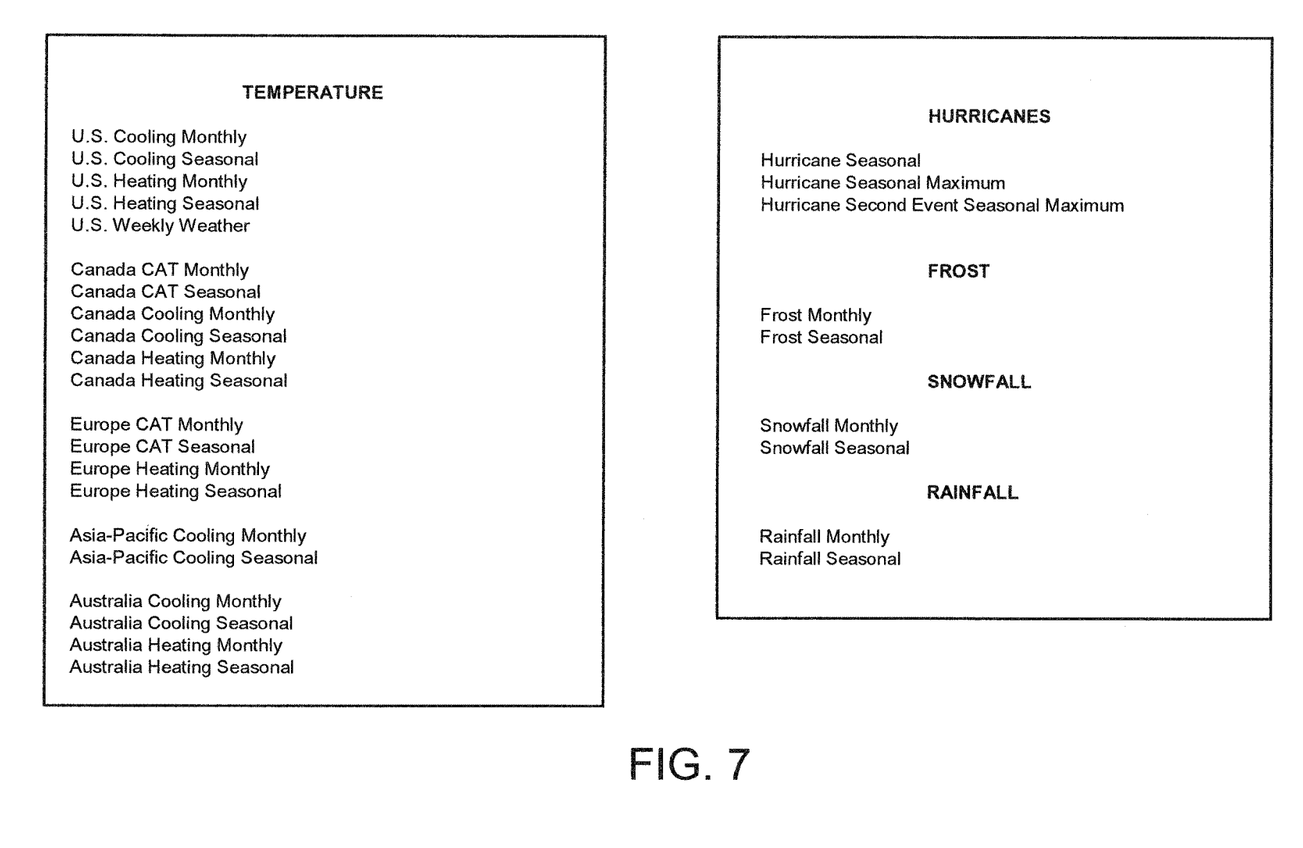
FIG. 7 illustrates an exemplary table for tradable weather products useful in implementing embodiments of the present disclosure.

The profiles and attributes from block 370 may be applied to one or more particular customers, merchants or service providers, markets, and other applications in order to provide particular insights for a select application. Such applications include by way of non-limiting example, providing information regarding how a merchant's financial performance is affected by adverse weather conditions across a variety of outcomes by creating utility curves with respect to particular weather variables. For example, a univariate (one weather function) or multivariate function (several weather functions to generate a customized synthetic product) related to one or more of temperature, snowfall, frost and hurricanes may be generated based on a range of weather conditions according to geographic location and season. The table shown in FIG. 7 provides a listing of exemplary weather products (within geographies) that may be traded. The products may be based on a range of weather conditions in more than 47 cities in the United States, Europe, Canada, Australia and Asia, and/or various regions within a given country, by way of non-limiting example. A predictive processing model 374 may be utilized in conjunction with current or forecasted weather predictive models in order to estimate a likely change in revenues as a function of one or more weather conditions. Such predictive processing models may use one or more algorithms such as time series algorithms that perform time based predictions (e.g. single, double, triple exponential smoothing algorithms), regression algorithms (e.g. linear, exponential, geometric, logarithmic algorithms), association algorithms (e.g. apriori), outlier detection algorithms (e.g. inter quartile range and nearest neighbor outlier), Bayesian algorithms, neural network algorithms, and the like. Additional applications may be directed to customer prospecting, customer relationship management, service interval predictions and reminders, as well as comparative profiling and evaluation of merchant and/or market costs of serviceable properties as a function of one or more weather conditions and output to the particular requestor/user based for example, on a specific user request or according to rule based processing.

Each or any combination of the modules and components shown in FIG. 3a may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 3a, these modules may perform functionality described later herein.

Figure 4A:
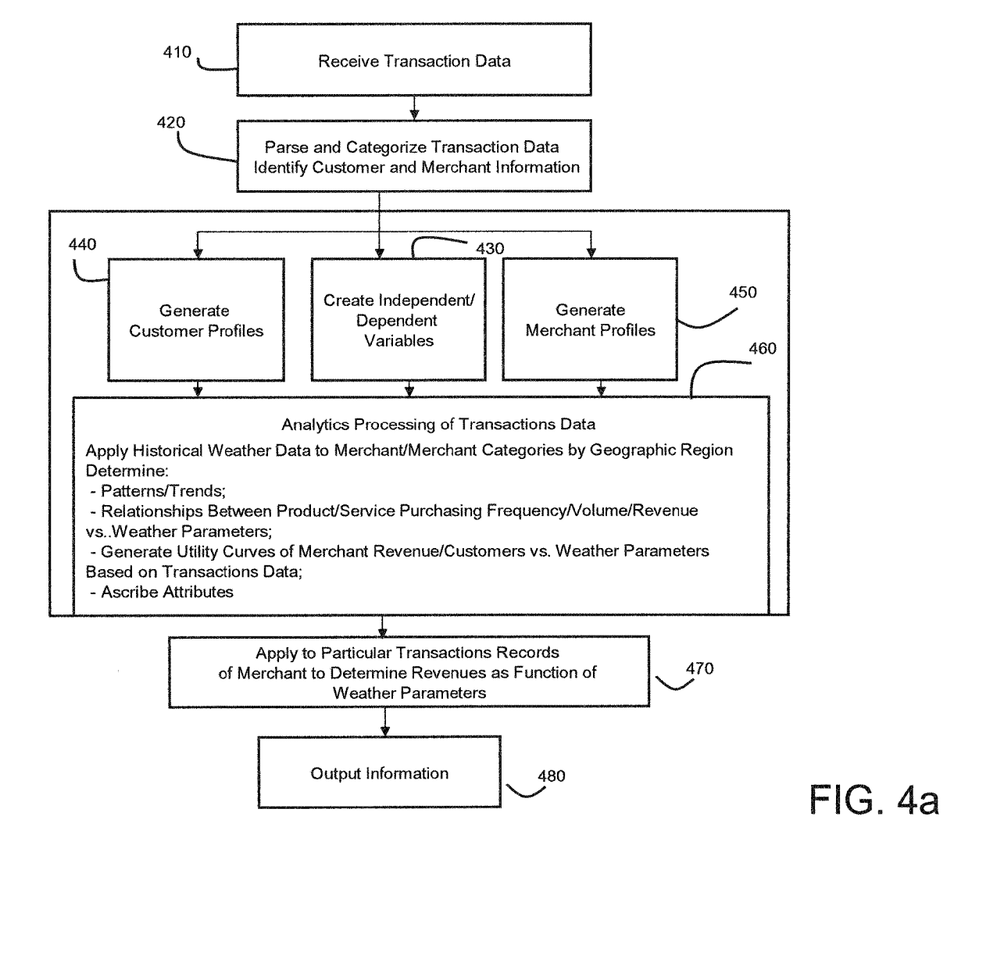
FIG. 4a illustrates an exemplary process flow for determining information based on transaction records and applying the determined information to a merchant profile for providing adjustments to merchant revenue based on one or more weather parameters, according to an embodiment of the present disclosure.

FIG. 4a shows an exemplary process flow wherein transactions records data 312 (FIG. 3a) for one or more payment card transactions containing customer account identifier (customer ID), customer geographic data, customer type, customer demographics data, merchant identifier (e.g. merchant name), merchant geography, and line of business is received (block 410) and then processed (block 420). As discussed hereinabove, analytics processing is performed on the data to categorize the transactions records data in a multiplicity of ways, in order to determine associations or logical relationships between components of the transactions records and derive drivers that influence frequencies associated with particular actions (e.g. amount purchased, frequency, time frame, etc.) by purchasers.

Categorization (block 420) may be performed in order to identify particular merchants or customers associated with transaction purchases of given products or services. The transaction data input to the analytics engine serves as either independent or dependent variables for processing. Variable definitions (block 430) may be created within the analytics engine for analysis of select products, merchants, services, actions, and/or customers, by way of non-limiting example. Specific preferences and profiles may also be generated and stored in the analytics engine for application to transactions records associated with particular categories of products, merchants, and/or customers, by way of non-limiting example only. In one exemplary embodiment, a particular type of transaction property (e.g. fuel purchase transactions) may be identified for analysis. The transactions records in the transaction database are processed and determined from the customer profile data (block 440) in order to categorize those merchants falling within that particular category. Profiles (block 450) for each merchant are also generated and may be further segmented according to geographic location, size, relative transaction amounts (which may be indicative of a type of customer or business to business), and the like.

Processing continues (block 460) wherein weather data is applied to the categorized transactions data and merchant profiles are processed according to select independent, dependent and/or specialized variables including various weather parameters and conditions. Statistical processing of the combined data is performed to identify trends, customer behaviors, and relationships between product and service purchases by customers, purchasing frequency intervals relating to particular customers, merchants and/or products and services, and probabilities associated with the likelihood of future customer purchases of particular products based on the analysis of the transactions data as a function of one or more weather parameters. Such variables may be derived from the particular transaction data or alternatively, used as default variables and updated as part of the analytic engine. Different weighting values or coefficients may be applied to the different variables in order to more finely tune the analysis. For example, more recent transaction data coupled with weather data may be weighted more heavily than older transaction data. Likewise, transactions records reflecting purchases in geographical areas outside of a predetermined area may be weighted less (or more) than those within the area, depending on the application.

Various standard statistical processing techniques including but not limited to regression analysis, correlation, analysis of variances, segmentation and clustering applied to the transactions data in order to determine and predict the effect particular categories of data have on other categories, and thereby determine drivers of particular actions (purchased services) associated with a given merchant and aggregate spend amounts represented in the transactions data.

Figure 4B:
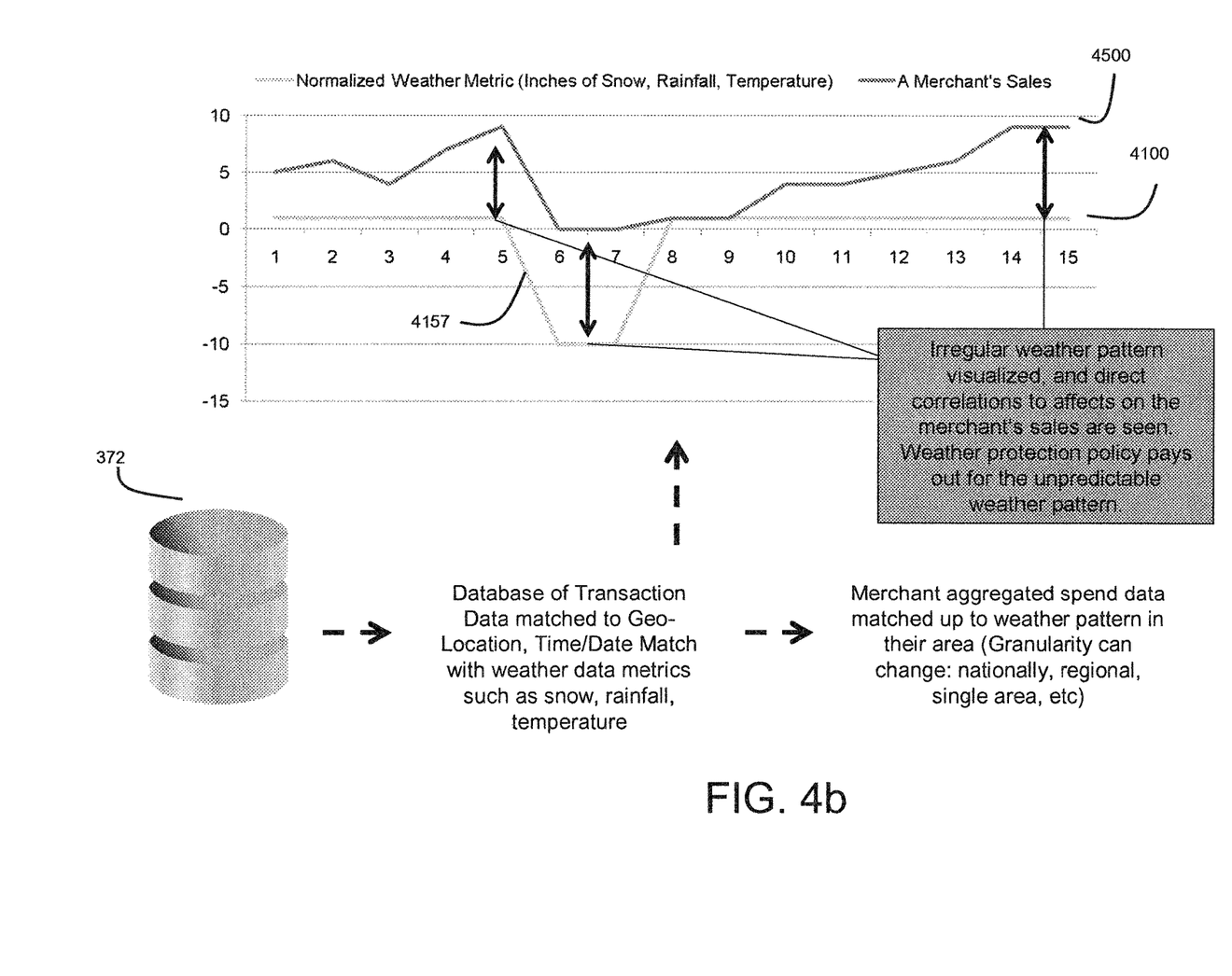
FIG. 4b shows an example of merchant sales volume as a function of a normalized weather metric useful for illustrating aspects of the present disclosure.

Based on the analytical payment card transaction data processing, select attributes are ascribed to the amount of recurring revenue attributed to a given merchant or merchants based on analysis of the payment card transaction records and the historic weather data. Such attributes, preferences, tendencies, correlations and associations are then applied (block 470) to select transactions data records for particular customers or merchants in order to provide information and insight for assessing the propensity for fluctuations of sales volume (purchase price and purchase frequency) for a given merchant as a function of a normalized weather metric. FIG. 4b depicts an example of an irregular weather pattern 4157 of a normalized weather metric 4100 and direct correlations to effects on a given merchant's sales curve 4500.

The information showing merchant financial performance and dependency on weather parameters may be output (480 of FIG. 4a) to one or more select merchants. The output data may reflect the amount of recurring revenue over a given time interval (e.g. per month) that may be lost due to particular abnormal weather conditions. In accordance with an aspect of the present disclosure, the computer system is configured to generate an offer of revenue protection or insurance covering a term and including a payout amount and one or more weather-specific payout conditions, based on the merchant revenue profile data and the recurring merchant revenue data from the payment card transactions. Therefore, the merchant can determine how much he or she is willing to pay in order to protect his/her business from those conditions in case they occurred based on his/her cost-benefit analysis and appetite for risk. In this way, a business can obtain a 'guaranteed weather' for the period in question, largely reducing the expenses/revenue variations due to weather. Alternatively, an investor seeking a certain level of return for a certain level of risk can determine what price he is willing to pay for bearing particular outcome risk related to a particular weather instrument.

Figure 5:
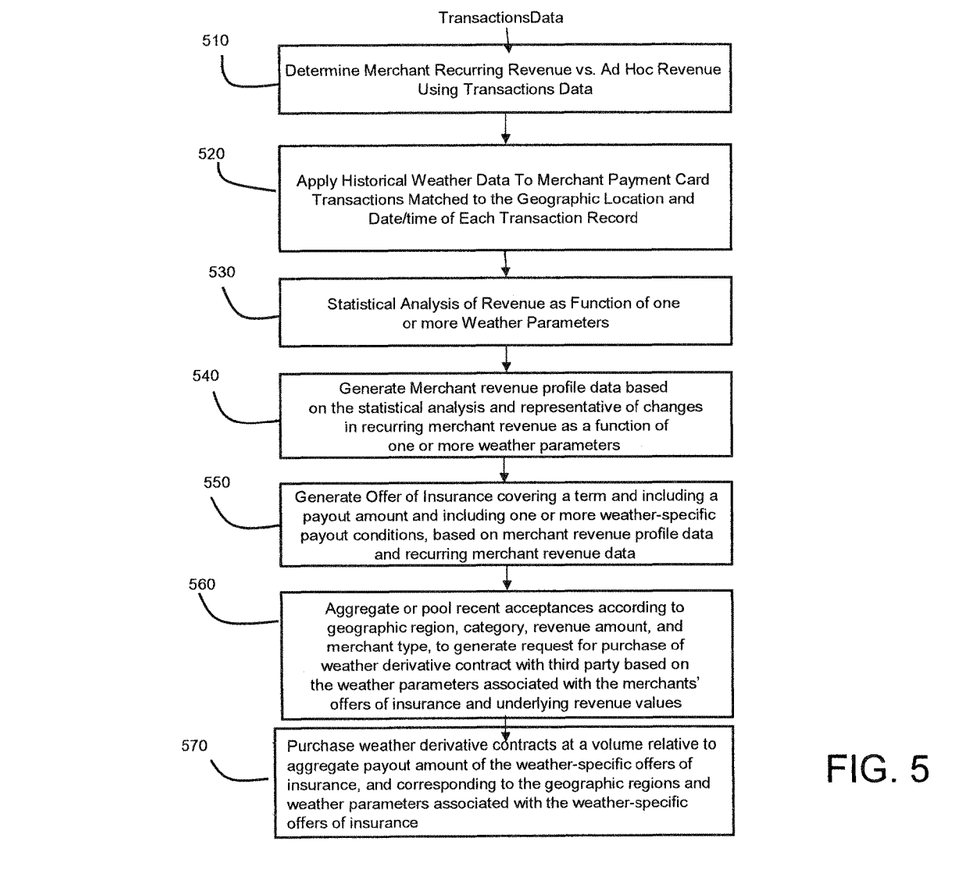
FIG. 5 illustrates an exemplary process flow for leveraging payment card transaction data to facilitate business cash flow for a merchant according to an embodiment of the present disclosure.
Figure 6:
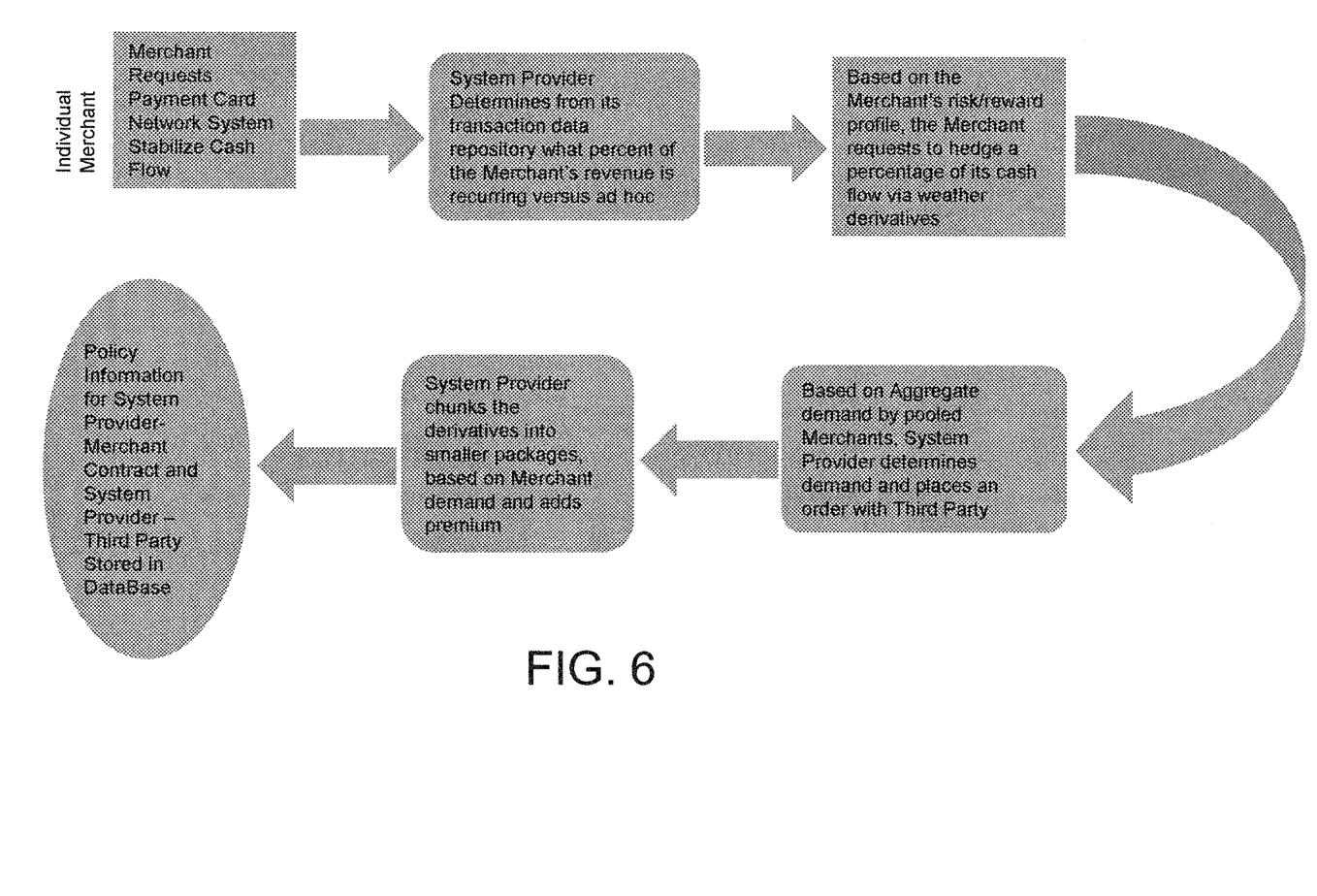
FIG. 6 illustrates an exemplary operational process flow using payment card transaction data for generating merchant revenue protection products according to an embodiment of the present disclosure.

FIG. 5 depicts a process flow for leveraging transaction data to facilitate business cash flow for a merchant. As shown, the system first determines (block 510) recurring revenue (cash flow) relative to ad hoc revenue using the payment card transaction data showing purchases by customers at the merchant location. The payment card transaction data is analyzed and the purchase amounts, purchase frequencies, customer identifier(s), and date/time, are aggregated and processed in order to determine an average recurring cash flow. Historical weather data is applied to the merchant transaction records (block 520) and matched to the geographic location and date/time of each transaction record. The historical weather data may be segmented into a plurality of weather parameters (e.g. temperature, precipitation, solarity, wind, etc.) and applied independently to the payment card transaction records. A statistical analysis (block 530) is performed based on the various weather parameters to determine the dependence or correlation of the recurring revenue as a function of one or more weather parameters. Merchant revenue profile data is generated based on the statistical analysis and representative of changes in recurring merchant revenue as a function of one or more weather parameters based on the payment card transaction data (block 540). Based on the determined changes and effects or influence that a given weather parameter manifests onto a particular merchant's recurring revenue (according to the payment card transactions processed over the network) the system may generate an offer of revenue protection (block 550) to one or more merchants covering a term and including a payout amount and including one or more weather-specific payout conditions. This offer is based on the merchant revenue profile data and the recurring merchant revenue data previously determined, with the amount of the hedge determined according to the particular merchant's appetite for risk. The system is configured to calculate the cost of the revenue protection based on the market bid/ask price for a given derivative weather product as offered by a third party, such as the CME (Chicago Mercantile Exchange) Group. By way of example only, the term may be weekly, monthly, or longer as offered by the third party. The system estimates merchant demand along with an estimate as to the premium (e.g. average, maximum, etc.) that merchants will likely be willing to pay to protect their revenue. The estimated values are then matched via an automated trading platform for trading on the appropriate number of derivatives. In the end, each of the merchants ends up owning a fractional portion of the total derivatives purchased by the system. In other words, once confirmation of acceptance of an offer for insurance and/or payment therefore has been received, the system may be configured to aggregate or pool recent acceptances according to geographic region, category, revenue amount, and merchant type, to generate a request for purchase of a weather derivative contract with a third party based on the weather parameters associated with the merchants' offers of insurance and their underlying revenue values (block 560). The system purchases the weather derivative contracts at a volume corresponding to the aggregate payout amount of the weather-specific offers of insurance, and corresponding to the geographic regions and weather parameters associated with the weather-specific offers of insurance. The system allocates fractional portions (block 570) of the value of the weather derivatives contracts to the weather-specific offers of insurance based on each of the accepting merchants' risk level and revenue protection level. The number of contracts, however, is integerized such that fractional amounts of contracts (e.g. 1½ contracts) cannot be allocated. By way of example, the insurance premium is expressed as $x per $1K number. FIG. 6 depicts an operational process flow representative of the actions performed.

It is to be understood that the above-identified examples are merely exemplary, and thus may be modified according to the requirements of a particular application. Weather guarantee policies of fixed priced amounts may be provided and monitored based on one or more weather related conditions. Alternatively, insurance coverage amounts consisting of a fixed price component and a variable component based on the magnitude of coverage being offered, and the corresponding conditions being insured against, may also be provided. Codes based on the specific weather conditions (e.g. amount of rain or snow, number of days of sunshine, temperature ranges, etc) may be returned and stored in the system data base for comparison with current weather data as provided via a weather feed or weather data base for determining whether payment on the policy is required. Such a validation routine may be performed in real time, or as part of a post processing routine at periodic intervals.

Payout conditions for the system may be determined according to the underlying transactions data associated with each merchant. For example, the system is configured to monitor and aggregate payment card transactions and process the transactions records data to determine recurring merchant revenue over a given time interval for a given merchant or class of merchants within a given geographic location. Historical weather data is then applied (normalized) and overlaid onto the recurring merchant revenue profile and analyzed to determine correlations and effects that changes in weather produce on merchant revenue over a particular time interval. This validation component is based on the underlying revenue from the payment card transactions to determine how susceptible a particular business is to a given weather parameter.

For example, for recurring merchant revenue based on payment card transactions determined to be $10,000 per month, the system allows the given merchant to purchase a contract to hedge his recurring revenue only up to the $10,000 per month limit against one or more weather parameters (e.g. temperature). By way of further example, a given merchant in a city (merchant A-Joe's Pizza) having a recurring revenue of $50,000 per month based on the system's analysis of the payment card transactions data, may utilize the system to purchase a contract from the system provider that hedges $20,000 against the average afternoon temperature in July dropping below 60 degrees for more than seven days. (The maximum amount that merchant A may hedge based on this example is $50,000 based on the recurring revenue determination by the system using payment card transaction data.) Similarly, another merchant (merchant B-Jim's Pizza) in the same city having a determined recurring revenue of $10,000 per month based on the system's analysis of the payment card transactions data, may utilize the system to purchase a contract from the system provider that hedges $10,000 (maximum amount) against the average afternoon temperature in July dropping below 60 degrees for more than seven days. To accomplish this, the system requests and purchases derivative weather contracts from a third party such as CME or CBOT at a given market price. The purchase price between the system provider and the third party will be based according to a given model and market factors, such as the Black-Scholes model associated with a given term and criteria (e.g. month of July, temperatures below 60 degrees for over 7 days), by way of example. The system aggregates the demand by pooled merchants requesting contracts by the system (Merchants A and B) in order to determine the total number of purchase contracts associated with particular terms and locations for purchase. Based on the aggregate demand by the pooled merchants, the system places orders that equal the aggregated amount to be covered. For the above example, assume that the bid/ask price for July temperature less than 60 degrees for the given location is $27 per $1K. Given the aggregate hedge value for Merchants A and B is $30K, the total number of purchase contracts obtained by the system is equal to 30. For a bid/ask price of $27 per $1K contract, the system transacts with the third party (CBOT/CME) for 30 contracts for a transaction price of $810. The system then calculates the relative value for allocation to each merchant and divides or chunks the derivatives into smaller packages for transaction with each of merchants A and B. That is, the system electronically transacts with Merchant A by multiplying the hedge amount ($20,000) by the bid/ask price obtained ($27 per $1K) to obtain a base amount, and adds a premium (e.g. 30% of the base amount) to obtain a total merchant revenue protection contract amount. In this example, the total merchant revenue protection contract amount for merchant A is $702 and for merchant B is $351. The revenue protection premium may also be expressed in $x per $1K (e.g. $35.1 per $1K). The merchant purchase of the particular revenue protection policy may be enabled over a networked connection and stored in the system database, along with the conditions for payout.

Figure 8:
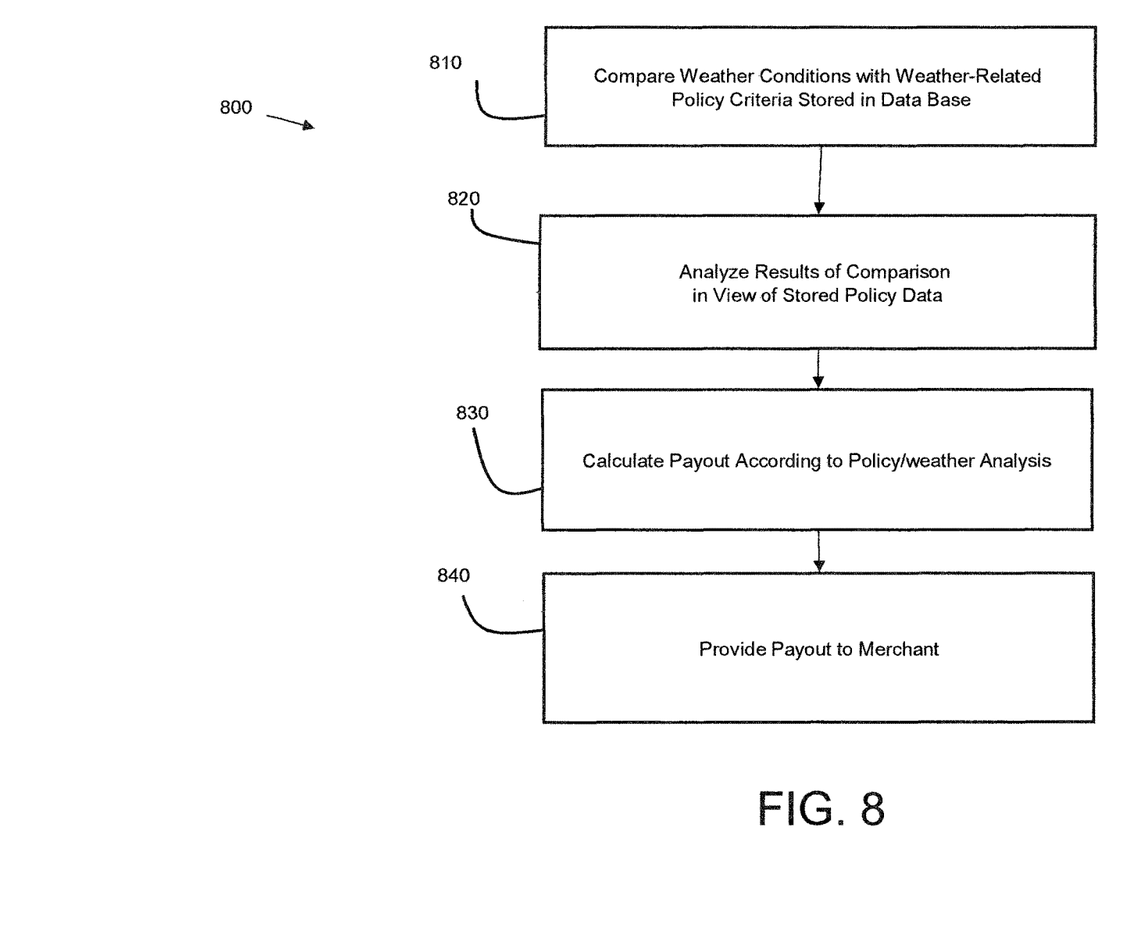
FIG. 8 illustrates an exemplary process flow for automatically generating refunds to merchants in the event a weather-related condition of the revenue protection policy has been met.

FIG. 8 illustrates an exemplary computer process flow for determining payout of a policy guarantee and automatically generating refunds to merchant card members in the event a weather-related condition of the policy has been met (or not met). Process 800 includes comparing one or more weather parameters (e.g. precipitation, solarity, temperature, etc.) received via a weather data feed associated with the select geographic location, with the weather-related criteria or conditions specified in the policy. Comparison of weather conditions and weather-related criteria may be made on a day-by-day basis or other specified time period (block 810). An analysis between the weather data from the feed and the conditions of the policy is performed in block 820. If one or more of the weather-related conditions are met that trigger payment according to the policy, a calculation may be automatically initiated by the system (block 830) to provide the appropriate payout amount (block 840) to the merchant. In one embodiment, a merchant may download a software-based application to their computing system (e.g. mobile device) through any conventional means. For example, a participant may access a web-based application stored on managing computer system 110 or another remote server via a remote computing device. The web-based application may include executable instructions for downloading an application according to embodiments of the present disclosure. Once downloaded and installed, the application may cause the merchant remote computing device to generate and display a user interface including a prompt to enter identification information to allow access to determine the status of the merchant-system agreement and weather parameter/payout conditions. In the event that the weather conditions for the merchant-system revenue protection agreement are met, the system may be configured to automatically credit the merchant's account according to the determined hedge amount. Similarly, the system is configured to automatically transact with the third party (e.g. CME or CBOT) to receive payment according to the terms of their policy by requesting from the third party payment on the system-third party derivative contracts purchased by the system.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems. In embodiments, one or more steps of a method may be performed manually, and/or manual verification, modification or review of a result of one or more processor-performed steps may be required in processing of a method.

The embodiments described herein are solely for the purpose of illustration. Those in the art will recognize that other embodiments may be practiced with modifications and alterations limited only by the claims.

The invention claimed is:

1. A computer-implemented method for generating offers of insurance on payment card transactions and for providing conditional payment for protection against weather or other natural phenomenon, the method comprising:
   storing in a database records data of payment card transactions conducted over an electronic payment card processing network of interconnected computing devices, the payment card transaction records data including at least a merchant identifier, a merchant location, a transaction date, and a transaction amount for each payment card transaction;
   at one of said interconnected computing devices configured in the electronic payment card processing network:
      determining via a computer processor, recurring merchant revenue for a given merchant over a given time interval based on the stored payment card transactions records data corresponding to said merchant;
      generating via the computer processor, merchant revenue profile data representative of changes in recurring merchant revenue as a function of one or more weather parameters, by applying historical weather data to the merchant payment card transaction record data, the historical weather data being matched to the location of the merchant business and the date and time of the payment card transaction records;
      generating an offer of insurance covering a term and including a payout amount and including one or more weather-specific payout conditions, based on the merchant revenue profile data and the recurring merchant revenue data;
      transmitting to the merchant, via a network other than the payment card processing network, the offer of insurance;
      responsive to receipt of acceptance of said offer:
         storing the weather-specific payout conditions of an insurance policy generated responsive to the acceptance of the offer of insurance; and
         purchasing, from a third party system based upon the payout amount and payout conditions, one or more weather-related contracts;
      monitoring a weather data feed for the merchant location associated with said accepted offer;
      analyzing data from the weather data feed and the weather-specific payout conditions of the insurance policy; and
      responsive to detection of at least one of said weather-specific payout conditions:
         automatically initiating a calculation of a corresponding payout amount;
         generating a credit transaction that credits the calculated payout amount to a merchant account corresponding to the merchant; and
         initiating a transaction with the third-party system to request payment according to terms of the one or more weather-related contracts purchased by the one of said interconnected computing devices.

2. The method of claim 1, further comprising storing in a database data corresponding to the one or more weather-specific payout conditions of the insurance agreement.

3. The method of claim 2, further comprising comparing one or more weather conditions during at least part of the term with weather-specific conditions of the insurance agreement, for determining whether an insurance payout is required.

4. The method of claim 3, wherein storing in the database the records data of the payment card transactions conducted over the electronic payment card processing network of interconnected computing devices comprises storing in the database payment card transaction records of a plurality of merchants; and processing the payment card transaction records via an analytics engine utilizing statistical analyses and techniques for categorizing merchants and generating one or more revenue profiles based on aggregated merchant payment card transactions data of a plurality of merchants of a the same category.

5. The method of claim 4, further comprising determining aggregate demand for said insurance according to the number of merchants within a given category and a given geographical region based on said processing of the payment card transactions data.

6. The method of claim 5, wherein purchasing one or more weather-related contracts comprises purchasing a volume of said weather-related contracts corresponding to the aggregate payout amount of the weather-specific offers of insurance, the one or more weather-related contracts corresponding to the geographic regions and weather parameters associated with the weather-specific offers of insurance; and further comprising allocating portions of the value of the one or more weather-related contracts to the weather-specific offers of insurance.

7. The method of claim 6, wherein storing the payment card transaction data comprising a merchant location comprises storing data indicative of a geographic region corresponding to the merchant location.

8. The method of claim 1, wherein said one or more weather parameters comprises one or more of temperature, solarity, and precipitation.

9. The method of claim 1, further comprising
responsive to receipt of acceptance of said offer:
pooling recent offer acceptances from a plurality of merchants according to one of geographic region, category, revenue amount, and merchant type; and
purchasing from a third-party system a weather derivatives contract based upon the pooled offer acceptances.

10. A system for generating offers of insurance on payment card transactions for protection against weather or other natural phenomenon, the system comprising:
one or more data storage devices containing payment card transaction data of a plurality of merchants, the payment card transaction data including at least a merchant identifier, a merchant location, a transaction date, and a transaction amount for each payment card transaction;
one or more processors;
a memory in communication with the one or more processors and storing program instructions, the one or more processors operative with the program instructions to:
analyze said payment card transaction data of one or more merchants of a given type and geographic region over a given time period to determine recurring merchant revenue;
apply historical weather data to the merchant payment card transaction record data to generate via the one or more processors, merchant revenue profile data representative of changes in recurring merchant revenue as a function of one or more weather parameters, the historical weather data being matched to the location of the merchant business and the date and time of the payment card transaction records;
generate an offer of insurance covering a term and including a payout amount and including one or more weather-specific payout conditions, based on the merchant revenue profile data and the recurring merchant revenue data;
transmit to the merchant, via a network other than the payment card processing network, the offer of insurance;
responsive to receipt of acceptance of said offer:
store the weather-specific payout conditions of an insurance policy generated responsive to the acceptance of the offer of insurance; and
purchase, from a third party system based upon the payout amount and payout conditions, one or more weather-related contracts;
monitor a weather data feed for the merchant location associated with said accepted offer;
analyze data from the weather data feed and the weather-specific payout conditions of the insurance policy; and
responsive to detection of at least one of said weather-specific payout conditions:
automatically initiate a calculation of a corresponding payout amount;
generate a credit transaction that credits the calculated payout amount to a merchant account corresponding to the merchant; and
initiate a transaction with the third-party system to request payment according to terms of the one or more weather-related contracts purchased by the one of said interconnected computing devices.

11. The system of claim 10, wherein the one or more processors is further operative with the program instructions to compare one or more weather conditions during at least part of the term with weather-specific conditions of the insurance agreement, for determining whether an insurance payout is required.

12. The system of claim 11, wherein the one or more processors is further operative with the program instructions to: store in a data base payment card transaction records of a plurality of merchants; and process the payment card transaction records via an analytics engine utilizing statistical analyses and techniques for categorizing merchants and generating one or more revenue profiles based on aggregated merchant payment card transactions data of a plurality of merchants of the same category.

13. The system of claim 12, wherein the one or more processors is further operative with the program instructions to determine aggregate demand for said insurance according to the number of merchants within a given category and a given geographical region based on said processing of the payment card transactions data.

14. The system of claim 13, wherein the one or more processors being operative with the program instructions to purchase the one or more weather-related contracts comprises the one or more processors being operative to purchase a volume of said weather-related contracts corresponding to the aggregate payout amount of the weather-specific offers of insurance, the one or more weather-related contracts corresponding to the geographic regions and weather parameters associated with the weather-specific offers of insurance; and wherein the processor allocates fractional portions of the value of the one or more weather-related contracts to the weather-specific offers of insurance.

15. The system of claim 14, wherein the payment card transaction data further includes merchant geographic region data.

16. The system of claim 10, wherein said one or more weather parameters comprises one or more of temperature, solarity, and precipitation.

* * * * *